United States Patent [19]

Mayne

[11] Patent Number: 5,104,278

[45] Date of Patent: Apr. 14, 1992

[54] PLUG SEEDLING EXTRACTOR AND METHOD OF USING SAME

[75] Inventor: Edwin R. Mayne, Lower Sackville, Canada

[73] Assignee: Atlantic Sunline Ltd., Parrsboro, Canada

[21] Appl. No.: 577,879

[22] Filed: Sep. 5, 1990

[30] Foreign Application Priority Data

Sep. 29, 1989 [CA] Canada .................................. 615463

[51] Int. Cl.⁵ .......................................... A01C 11/00
[52] U.S. Cl. .................................... 414/417; 111/100; 47/73
[58] Field of Search ............... 414/417; 111/100, 104, 111/105, 200; 47/73, 85

[56] References Cited

U.S. PATENT DOCUMENTS

| | | | |
|---|---|---|---|
| 1,433,417 | 10/1922 | Rosa | 249/76 |
| 2,829,468 | 4/1958 | Van Wingerden | 47/1.01 |
| 3,722,719 | 3/1973 | Frank | 414/417 |
| 4,247,241 | 1/1981 | Warren | 414/417 |
| 4,388,035 | 6/1983 | Cayton et al. | 414/417 |
| 4,443,151 | 4/1984 | Armstrong et al. | 414/417 X |
| 4,854,802 | 8/1989 | deGroot | 414/417 X |

FOREIGN PATENT DOCUMENTS 2580457 10/1986 France .
8601975 4/1986 PCT Int'l Appl. .
2166634 5/1986 United Kingdom .............. 111/105

*Primary Examiner*—Frank E. Werner
*Assistant Examiner*—James Eller
*Attorney, Agent, or Firm*—Robert A. Wilkes; Gerry J. Elman

[57] ABSTRACT

A plug seedling extractor for use with a plurality of variously-sized plug seedling trays is disclosed. The extractor has a base plate assembly with a plurality of extractor pins and an extraction table assembly with a plurality of holes aligned with the extractor pins. A plurality of threaded bolts having lock nuts mate with coupling nuts on the base plate assembly to slidingly connect and vary the height between the extraction table assembly and the base plate assembly. Each of a pair of hand-actuated levers are connected to the extraction table assembly and the base plate assembly on one side to cause relative motion between the extraction table assembly and the base plate assembly. The plug seedling tray slides over the extraction table assembly and is held in position by the cooperation of vertical restraining bars directly over the tray with rear and side alignment bars. The levers are actuated to cause the extraction table assembly to slide down the threaded bolts so the extractor pins pass through the aligned holes in the extraction table assembly and through the plug seedling trays to extract the plug seedlings.

11 Claims, 3 Drawing Sheets

PLUG SEEDLING EXTRACTOR AND METHOD OF USING SAME

BACKGROUND OF THE INVENTION

1. Field of the Invention

The present invention relates generally to a plug seedling extractor to facilitate the removal or extraction of seedlings from plug seedling trays. After germination, transplantation of the tiny fragile seedlings from the seedling tray to a larger growing environment is necessary. The present invention quickly and efficiently extracts the seedlings from the plug seedling tray with minimal damage to the plug of soil, the seedling, and its root system.

2. Description of Related Art

Traube in British Patent No. 341,819 dated Jan. 22, 1931 discloses a device for molding seedling plugs and extracting the molded seedling plugs from the mold. The device is impractical because the seedlings are grown apart from the device, molded in the device, and then presumably transplanted into another device immediately after molding. The device is too bulky for mass marketing or shipping.

Blackmore, et al, in U.S. Pat. No. 3,799,078 generally discloses a method of transplanting plug seedlings from a plug seedling tray to larger containers. The method involves extractor pins with concave openings at the tips of the pins. The extractor pins push the plug seedlings downwardly through the plug seedling tray. There is a great likelihood of damage to the foliage of the seedling if it is not extracted from the plug seedling tray relatively soon after germination.

Blackmore, Jr., in U.S. Pat. No. 4,197,674 discloses a plug seedling tray for use with extractor pins that pass upwardly through the bottom of the seedling tray to extract the plug seedlings, but no particulars of the device used with the plug seedling tray are provided.

Accordingly, no device is disclosed in prior art suitable for use with a plurality of variously-sized plug seedling trays for extracting the seedlings with minimal damage to the seedling itself and to the plug containing the root system.

SUMMARY OF THE INVENTION

In accordance with the present invention, a plug seedling extractor for use with a plurality of variously-sized plug seedling trays is provided.

Typically, a plug seedling tray comprises a plurality of compartments, each having an aperture at its bottom. Each compartment contains a plug of soil with the proper nutrients to support the growth and development of the root structure of the seedlings. The size of the plug seedling tray and the compartments will vary depending on the particular type of seedling grown in the tray and its desired size prior to planting. Accordingly, it is preferable for the plug seedling extractor to be versatile enough to be used with a plurality of variously-sized plug trays.

The plug seedling extractor of the present invention has a base plate assembly with a plurality of extraction pins and an extraction table assembly, which is spaced above the base plate assembly, that has a plurality of holes aligned with the extractor pins. A plurality of threaded bolts having lock nuts mate with coupling nuts on the base plate assembly to slidingly connect and vary the height between the extraction table assembly and the base plate assembly. A pair of hand-actuated levers are connected to the extraction table assembly and to the base plate assembly on opposite sides to cause relative motion between the extraction table assembly and the base plate assembly. A plug seedling tray is slid onto the extraction table assembly and is held in position by the cooperation of vertical pressure bars directly over the tray and rear and side alignment bars. The levers are actuated to cause the extraction table assembly to slide down the threaded bolts so that the extractor pins pass through the aligned holes in the extraction table assembly and through the plug seedling trays to extract the plug seedlings. The extractor pins pass upwardly through the plug seedling trays to push the plug of soil and the seedling out, thereby minimizing damage to the foliage of the seedling. The tips of the extractor pins have a domed or spherical shape to minimize damage to the plug and root system as the pins pushes against the plug. The vertical pressure bars and side pressure bars minimize flexure of the plug seedling tray which prevents misalignment of the holes due to such flexure and prevents breakage or warpage of the tray due to the flexure. The other end of the extraction pin has a flange or head portion. The flange or head portion is preferably clamped between the base plate and a retaining pin plate within the base plate assembly to provide a floating connection which minimizes misalignment of the holes.

Accordingly it is the object of the present invention to provide a plug seedling extractor which minimizes seedling damage.

It is a further object to provide a plug seedling extractor suitable for use with a variety of plug seedling trays.

Various advantages and features of novelty which characterize the invention are pointed out with particularity in the claims annexed hereto and forming part hereof. However, for better understanding of the invention, its advantages and object obtained by its use references should be made to the drawings which form a further part hereto and its accompanying descriptive matter in which there is illustrated and described preferred embodiments of the invention.

DETAILED DESCRIPTION OF THE PREFERRED EMBODIMENT

Figure 1:
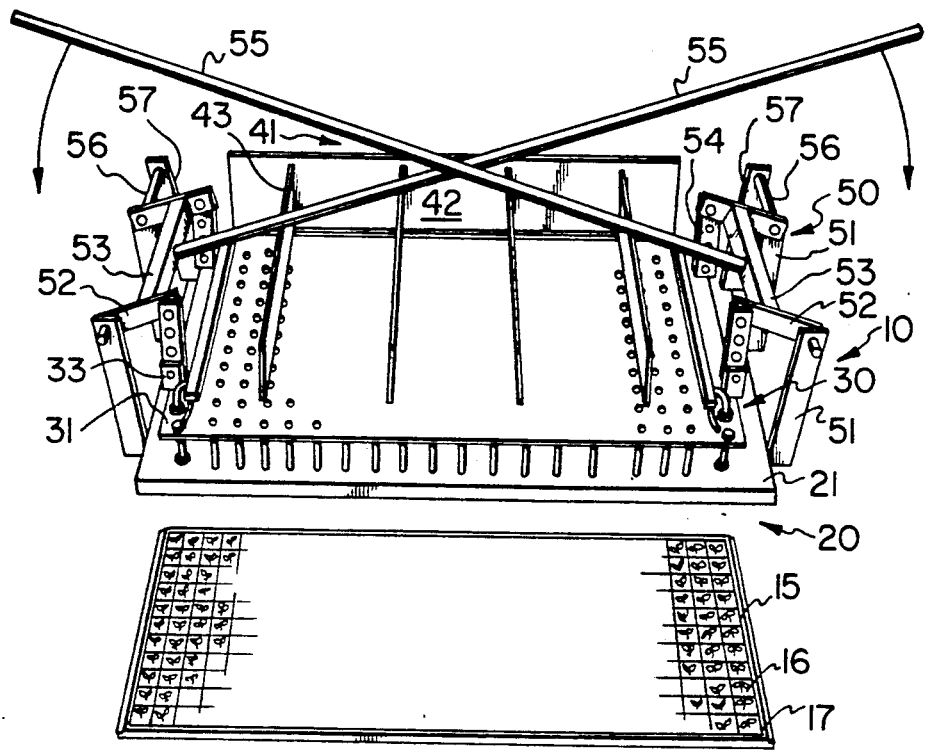
FIG. 1 is a front view of the plug seedling tray and the plug seedling extractor.

Referring to the drawings wherein like numerals indicate like elements, a plug seedling extractor in accordance with the present invention is generally shown as 10.

Figure 5:
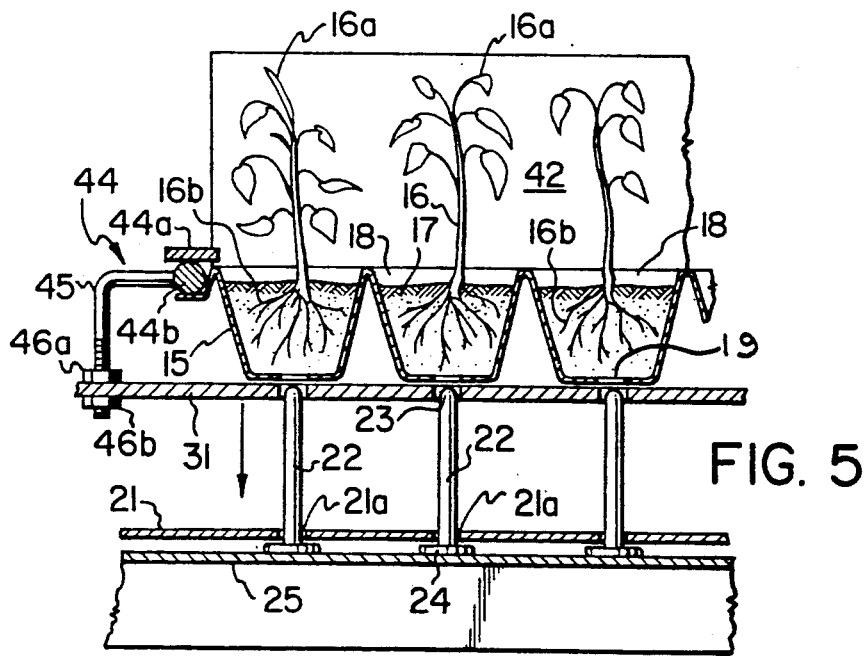
FIG. 5 is a partial front sectional view taken along line 5—5 in FIG. 4 of the plug seedling extractor with a plug seedling tray in place on the extraction table assembly.

Referring to FIG. 1 plug seedling extractor 10 and a plug seedling tray 15 are shown. Plug seedling tray 15 as shown in FIG. 5 comprises a plurality of compartments 18 having bottom apertures 19. Disposed in each compartment 18 is a plug of soil 17 and a seedling 16 having a foliage 16a and a root system 16b. Typically, plug seedling trays are large flexible plastic trays subject to warpage and breaking under extraction conditions.

The preferred embodiment of the plug seedling extractor comprises positioning mechanism and a base plate assembly 20. An alternative embodiment of the plug seedling extractor comprises actuating mechanism 50 also.

The base plate assembly shown in FIG. 5 comprises an inverted rectangular pan or base plate 21 having a plurality of holes 21a in base plate 21. A plurality of extractor pins 22 project through holes 21a in base plate 21. Each extractor pin 22 has a domed tip 23 and a head 24. The tip is domed or radiused to prevent any penetration and/or breakup of plug 17 or damage to seedling root system 16b and to assist in the alignment of extractor pins 22 and entrance of extractor pins 22 into bottom apertures 19. The pin tip 23 may be domed at a radius of between 100% and 200% of the pin cross section radius to the pin perimeter or to within 25% of the distance from the pin centre to pin perimeter, then at between 25% of the cross-section radius or such lesser percent of the cross-section radius as will maintain a smooth curvature of surface between the pin tip and the pin side.

Preferably pin tip 23 is domed at a radius of 125% of the pin cross-section radius to within 10% of the distance from the pin centre to perimeter, then at 10% of the cross-section radius to the pin perimeter. Head 24 prevents extractor pin 22 from being pulled up through the hole in the base plate. A pin retaining plate 25 and base plate 21 are secured together and cooperate to provide a free floating attachment of extractor pins 22 to base plate assembly 20. The free floating attachment permits indexing of bottom apertures 10 with extractor pins 22. If extractor pin 22 should become misaligned it can be easily aligned since there is no rigid connection between pin 22 and base plate assembly 20.

Figure 2:
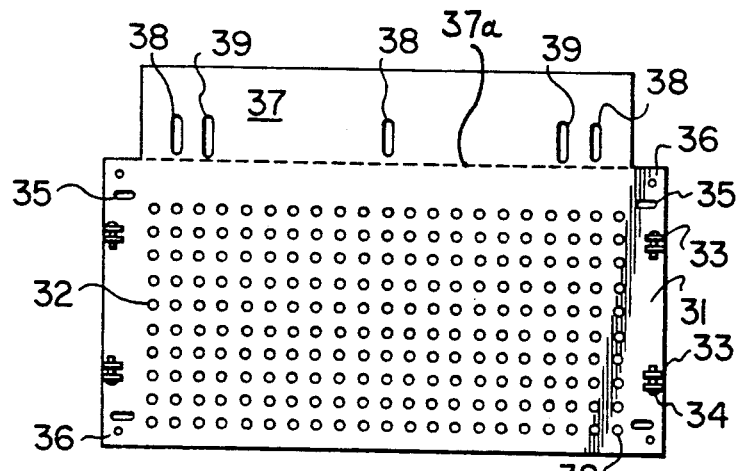
FIG. 2 is a top plan view of the extraction table assembly in a unfinished form.

A positioning mechanism is provided to position the plug seedling tray during the extraction process. Referring to FIG. 1 the positioning mechanism which comprises the extraction table assembly 30 and holding mechanism 40, is shown. As best shown in FIG. 2 extraction table assembly 30 comprises an extraction table 31, a rear support plate 37, anchor blocks 33, and clevis pins 34 for use with anchor blocks 33. In the preferred embodiment rear support plate 37 is formed integral to extraction table 31. The top surface of rear support plate 37 and extraction table 31 are viewed in FIG. 2. Prior to assembly of plug seedling extractor 10, rear support plate 37 is bent upwardly along bend line 37a so the top surface of rear support plate 37 is then angled substantially 90 degrees from the top surface of extraction table 31. Rear support plate 37 may be formed separate from extraction table 31 and subsequently secured to extraction table 31 in a conventional manner such as welding, riveting or using threaded fasteners.

The extraction table 31 preferably has anchor block 33 welded to its top surface but any conventional fastening method may be used. Disposed across extraction table 31 are a plurality of through holes 32, which are aligned with extractor pins 22 and apertures 19. A plurality of threaded bolts 11 are provided to connect the extraction table assembly 30 to the base plate assembly 20. Each of the threaded bolts 11 also functions as a height varying means in cooperation with a lock nut 12 and a coupling nut 26 to vary the rest height which is the height of extraction table 31 above base plate 21 when the plug seedling extractor is in a first position prior to actuation of the plug seedling extractor. Coupling nut 26 is preferably welded to the top surface of base plate 21. Lock nut 12 is threaded onto threaded bolt 11 and threaded bolt 11 is threaded into coupling nut 26.

Figure 3:
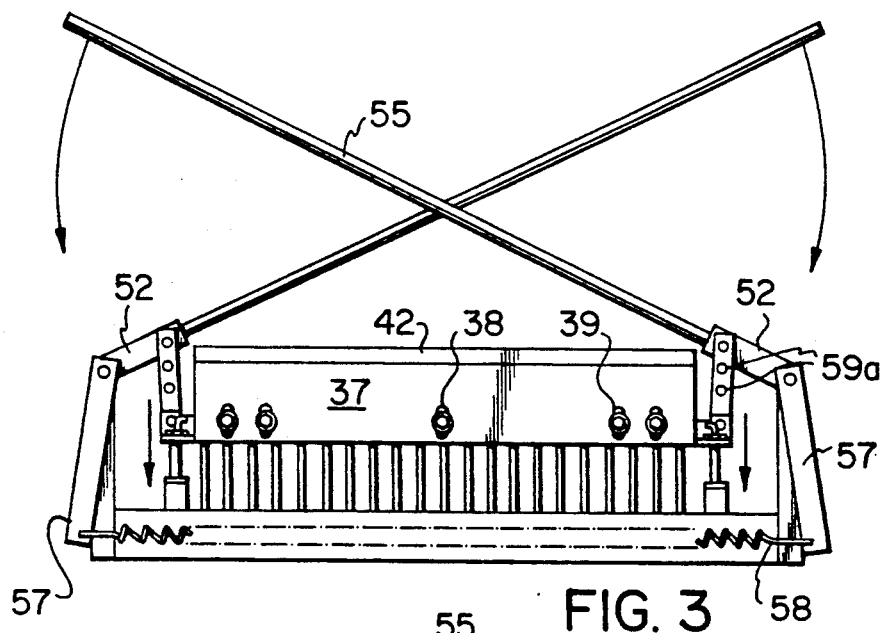
FIG. 3 is a rear view of the plug seedling extractor.
Figure 4:
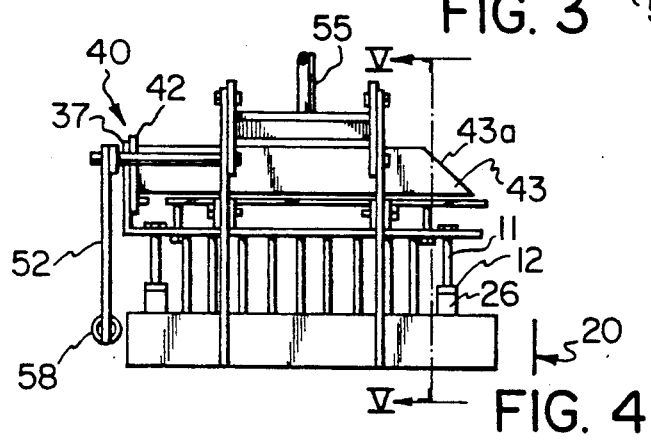
FIG. 4 is a side view of the plug seedling extractor.
Figure 6:
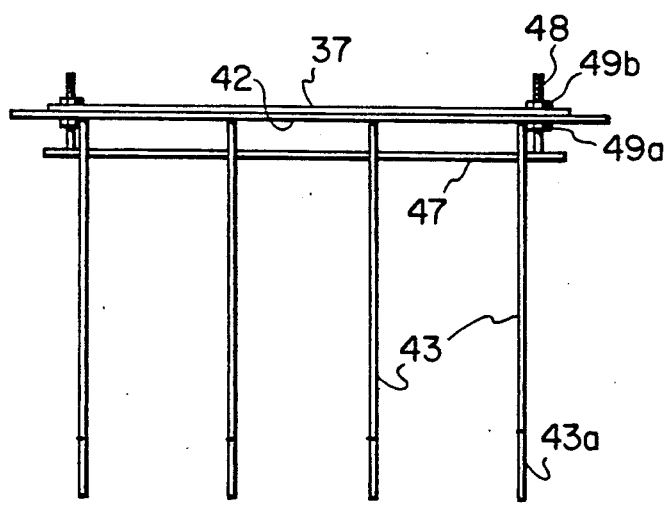
FIG. 6 is a top plan view of the vertical pressure assembly with portions of the plant seedling extractor omitted for clarity.

Referring to FIGS. 4, 5, and 6 holding mechanism 40 is shown. Holding mechanism 40 comprises a vertical restraining assembly 41, a pair of side restraining and alignment bars 44, and rear alignment rod 47. Vertical restraining assembly 41 comprises a back plate 42 having a plurality of vertical restraining bars 43 depending therefrom. As seen in FIGS. 2 and 6 the rear support plate 37 has slots 38 to provide vertical adjustment of back plate 42. Preferably vertical restraining bars 43 are welded to back plate 42 although any suitable connection such as rivets or threaded fasteners may be used also. Vertical restraining bars 43 have angled tips 43a to separate foliage 16a of adjacent seedlings 16 without damaging foliage 16a as the plug seedling tray is slid along extraction table 31. Vertical restraining bars 43 during extraction are directly over plug seedling tray 15. As best seen in FIG. 5 side restraining and alignment bar 44 comprises side restraining bar 44a preferably welded to side aligning rod 44b. As shown in FIG. 1 side aligning rods 44b have angled ends to facilitate the alignment of the plug seedling tray as it is slid onto extraction table 31. A pair of curved threaded rod 45 are secured proximal to the ends of aligning rods 44b. Threaded curved rods 45 have lower ends which pass through slots 35 in extraction table 31, which allow horizontal adjustment of the side restraining and alignment bar 44, secured to the extraction table 31 by adjusting nuts 46a, 46b, which provide vertical adjustment of side restraining and alignment bar 44. Each side restraining and alignment bar 44 is disposed on one side of the plug seedling extractor to serve as a side guide for aligning apertures 19 of plug seedling tray 15 with holes 32 of the extraction table 31. As best seen in FIGS. 2, 3 and 6 rear alignment rod 47 is secured to rear support plate 37 and back plate 42 by a pair of threaded rods 48 extending through slots 39 in rear support plate 37. Rear alignment rod 47 is disposed along the rear of plug seedling extractor 10 to serve as a rear guide for aligning apertures 19 of plug seedling tray 15 with holes 32 of extraction table 31.

In alternative embodiment of plug seedling extractor 10, actuating mechanism 50 is provided. As best seen in FIG. 1, actuating mechanism 50 provides the motion for the plug seedling extractor. A pair of hand actuated levers 55 are provided to reduce the amount of effort required to actuate the plug seedling extractor. Lever 55 is connected to a coupling member 53. Lever links 52 are connected to opposite sides of coupling member 53 and are operatively connected at one end to extraction table assembly 30 through a pin connection to extraction links 54 and height adjustment holes 54a in links 54. Extraction links 54 are connected to the extraction table 31 through anchor blocks 33 with clevis pins 34 (see FIG. 2). Lever links 52 are connected at the other end to lever axis extension bar 51 through a pin connection. Lever axis extension bars 51 are welded to the base plate assembly.

Referring to FIG. 3, after the actuation of levers 55 to extract the plug seedlings, a spring lever or restoring means 58, which is operatively connected to levers 55 through spring levers 57, acts to restore the levers to their initial rest position.

Referring to FIG. 6, a top view of the vertical restraining assembly is shown. Vertical restraining bars 43 having angled tips 43a are connected to back plate 42. Back plate 42 is slidingly connected to rear support plate 37. Disposed just beneath the vertical restraining bars is rear alignment rod 47 that has threaded rods 48 depending therefrom proximal to either end. Threaded rods 48 pass through both back plate 42 and rear-support plate 37. Adjustments of nuts 49a and 49b are provided to connect threaded rods 48 and back plate 42 and rear support plate 37.

In operation plug seedling tray 15 is slid onto extraction table 31. Side alignment bars 44 and rear alignment rod 47 are adjusted to provide alignment for plug seedling tray 15 along the sides and rear so that the apertures 19 of the plug seedling tray are aligned with holes 32 in the extraction table and with the longitudinal axis of the extractor pins 22. The height varying means 11, 12, and 26, height adjustment holes 54a in actuating means 50, as well as vertical restraining assembly 41 are also adjusted to insure proper clearance of plug seedling tray 15. The plug seedling extractor is now in the first position just prior to actuation. The distance between the extraction table 31 and the top base plate 21 in this first position is defined as the rest height.

Hand levers 55 are then grasped and downwardly. Hand levers 55 through the pin connections and actuating means 50 will cause extraction table assembly 30 and the holding mechanism, which is the side restraining and alignment bars and the rear alignment rod, together with the vertical restraining mechanism to all move downwardly towards the extraction pins 22. The positioning mechanism is defined as the extraction table assembly and the holding mechanism. As the positioning mechanism moves downwardly towards the extractor pins, the extractor pins will first pass through holes 32 in the extraction table then through apertures 19 in the plug seedling tray and contact the plug disposed in each cavity 18 of the plug seedling tray 15. Extraction pins 22 will contact but neither penetrate nor break up plug 17 due to the domed or spherical surface of the tip of the extraction pin 22. Extractor pins 22 will push plugs 17 out of the plug seedling tray 15. As the extractor pins 22 press against the plugs in plug seedling tray 15, a force will be created along the bottom of the plug seedling tray 15. Typically a plug seedling tray is a large flexible plastic tray. Thus the plug seedling tray will flex in response to this initial pressure caused by extractor pins 22. The vertical restraining bars 43 are provided to hold the plug seedling tray in position and minimize upward or vertical flexure of the plug seedling tray. Side restraining and alignment bars 44 minimize the flexure along the sides of the plug seedling tray. The flexure of the plug seedling tray should be minimized because when the tray flexes there is a potential for a misalignment between apertures 19 and holes 32 in the extraction table. There is also a possibility that excessive flexure will cause a permanent warpage of the tray which will cause the tray to be inoperative with the plug seedling extractor. Finally, excessive flexure of the tray may result in breakage of the tray.

Numerous characteristics and advantages of the invention have been set forth in the foregoing description together with details of structure and function of the invention and novel features thereof are pointed out in the appended claims. The disclosure, however, is illustrative only and changes may be made in detail especially in matters of shape, size and arrangments of parts within the principal of the invention to the full extent indicated by the broad general meaning of the terms in which the appended claims are expressed.

I claim:

1. a plug seedling extractor, constructed and arranged for use with a plug seedling tray including a plurality of seedling compartments, each having a bottom aperture, and containing a seedling in a plug, which comprises in combination:
   (a) a substantially horizontal base plate assembly having a front, a rear, and two sides;
   (b) a plurality of extractor pins supported by the base plate arranged in a plurality of rows and columns, and extending substantially vertically upwardly therefrom;
   (c) a pin attachment means attaching the pins to the base plate, the pin attachment means providing a predetermined amount of lateral movement independently to each pin;
   (d) an interchangeable extraction table assembly, adapted to support at least one seedling tray and including a plurality of holes aligned with the extractor pins;
   (e) a table attachment means moveably attaching the table to the base plate;
   (f) a tray holding means, including tray alignment means, attached to the extraction table assembly constructed and arranged to hold a plug seedling tray in position on the extraction table assembly in alignment with the extractor pins and to minimize seedling tray warpage during seedling extraction;
   (g) a lever means constructed and adapted to move the extraction table assembly together with the tray alignment means and the tray holding means from a first position wherein the extractor pins are disposed below the extraction table to a second position wherein the extractor pins are disposed through both the extractor table assembly holes and the seedling tray compartment bottom holes to a predetermined distance whereby the seedling plugs are extracted from the seedling tray; and
   (h) a restoring means constructed and adapted to return the extraction table assembly together with the tray alignment means and the tray holding means from the second position to the first position.

2. A plug seedling extractor according to claim 1 constructed and arranged to extract seedling plugs from any one of a plurality of differently dimensioned seedling trays by changing the extractor table assembly.

3. A plug seedling extractor according to claim 1 wherein the table attachment means includes means for adjusting the amount of relative movement between the first position and the second position.

4. A plug seedling extractor according to claim 1 wherein the lever means includes in combination at least one first relatively long hand-actuated lever, a pivot means for attaching the at least one lever to the base plate, and at least one relatively short second lever link means connected between the extraction table assembly and the hand-actuated lever.

5. A plug seedling extractor according to claim 1 wherein the lever means includes two hand-actuated levers connected to the base plate, each lever having two second short lever link means attached between the extraction table assembly and the hand actuated lever.

6. A plug seedling extractor according to claim 1 wherein the table attachment means includes means for adjusting the first position of the extraction table assembly above the base plate to accommodate seedling trays of differing height. means for adjusting the first position of the extraction table assembly above the base plate to accommodate seedling trays of differing height.

7. A plug seedling extractor according to claim 1 wherein the holding means includes a positioning means adjustable to accommodate seedling trays of differing sizes.

8. A plug seedling extractor according to claim 7 wherein the positioning means includes a rear support plate extending upwardly from the extraction table assembly; a back plate including a plurality of forwardly extending substantially horizontal bars adapted to engage the top of the seedling tray between seedling plugs; and a connecting means for connecting the back plate to the support plate providing vertical adjustment of the back plate relative to the support plate thereby to accommodate seedling trays of differing heights.

9. A plug seedling extractor according to claim 7 wherein the positioning means includes a horizontally and vertically adjustable rear alignment means thereby to accommodate seedling trays of differing sizes.

10. A plug seedling extractor according to claim 7 wherein the positioning means includes horizontally and vertically adjustable side alignment means constructed and adapted to align the seedling tray and to restrain the sides thereof against vertical movement.

11. A plug seedling extractor according to claim 8 wherein the forwardly extending horizontal bars have a thin elongate construction, a bottom edge of which engages the seedling tray, and the forward end of which is angled rearwardly, so that on insertion of a seedling tray the bar serves to separate the foliage of adjacent seedlings.

* * * * *